United States Patent [19]
Dorsch

[11] Patent Number: 4,840,384
[45] Date of Patent: Jun. 20, 1989

[54] FACE-TYPE SHAFT SEAL WITH SHROUD

[75] Inventor: Glenn R. Dorsch, Aberdeen, Wash.

[73] Assignee: Vaughan Co., Inc., Montesano, Wash.

[21] Appl. No.: 93,464

[22] Filed: Sep. 4, 1987

[51] Int. Cl.[4] .............................................. F16J 15/36
[52] U.S. Cl. ....................................... 277/12; 277/68; 277/81 R; 277/89
[58] Field of Search ............. 277/81 R, 42, 43, 88–90, 277/67–69

[56] References Cited

U.S. PATENT DOCUMENTS

| | | | |
|---|---|---|---|
| 2,447,663 | 8/1948 | Payne | 277/89 X |
| 2,480,506 | 8/1949 | Payne | 277/42 |
| 2,512,749 | 6/1950 | McCloskey | 277/89 |
| 2,769,390 | 11/1956 | Heimbuch | 277/90 X |
| 3,184,244 | 5/1965 | Van Vleet | 277/83 |
| 3,188,095 | 6/1965 | Van Vleet | 277/27 |
| 3,356,378 | 12/1967 | Tracy | 277/81 R X |
| 3,774,323 | 11/1973 | Vaughan | 37/58 |
| 3,973,866 | 8/1976 | Vaughan | 415/121 B |
| 4,103,904 | 8/1978 | Tankus | 27/89 X |
| 4,406,465 | 9/1983 | Rockwood et al. | 277/96.1 |
| 4,477,088 | 10/1984 | Picard | 277/88 |
| 4,576,384 | 3/1986 | Azibert | 277/81 S |
| 4,625,977 | 12/1986 | Azibert et al. | 277/82 |

FOREIGN PATENT DOCUMENTS

| | | | |
|---|---|---|---|
| 639819 | 5/1962 | Italy | 277/89 |
| 109667 | 2/1944 | Sweden | 277/43 |
| 653608 | 5/1951 | United Kingdom | 277/89 |
| 1325940 | 8/1973 | United Kingdom | 277/89 |

Primary Examiner—Robert S. Ward, Jr.
Attorney, Agent, or Firm—Ward Brown; Robert W. Beach

[57] ABSTRACT

The face seal of a centrifugal pump has a stationary seal component mounted on the pump casing and a rotary seal component rotatable with the drive shaft extending into the casing and connected to the inner rotary pumping member or impeller. The rotary seal component is biased against the stationary seal component by a resilient welded metal bellows assembly having its end portion opposite the rotary seal component clamped to the drive shaft. To protect the welded metal bellows assembly against abrasive life-shortening contact with particulates in the liquid being pumped, a rigid shroud is provided including a generally cylindrical cavity having an inner wall portion extending close alongside the bellows for at least substantially the full axial extent of the bellows.

7 Claims, 2 Drawing Sheets

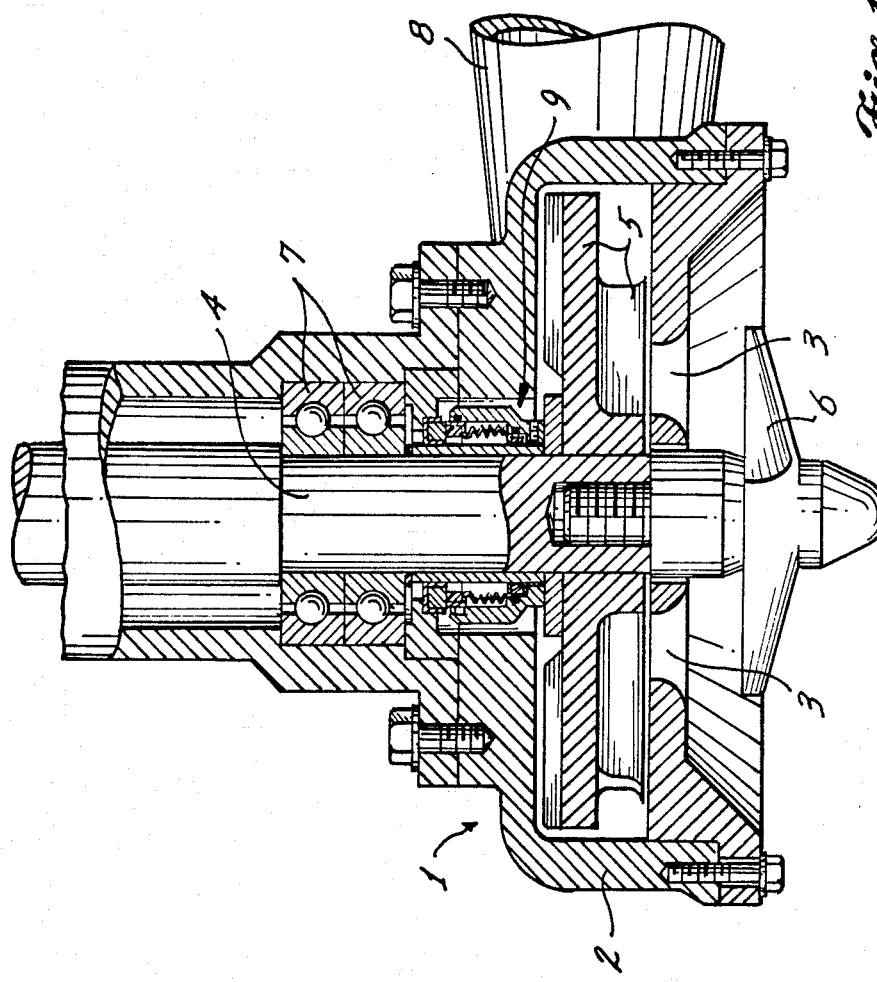

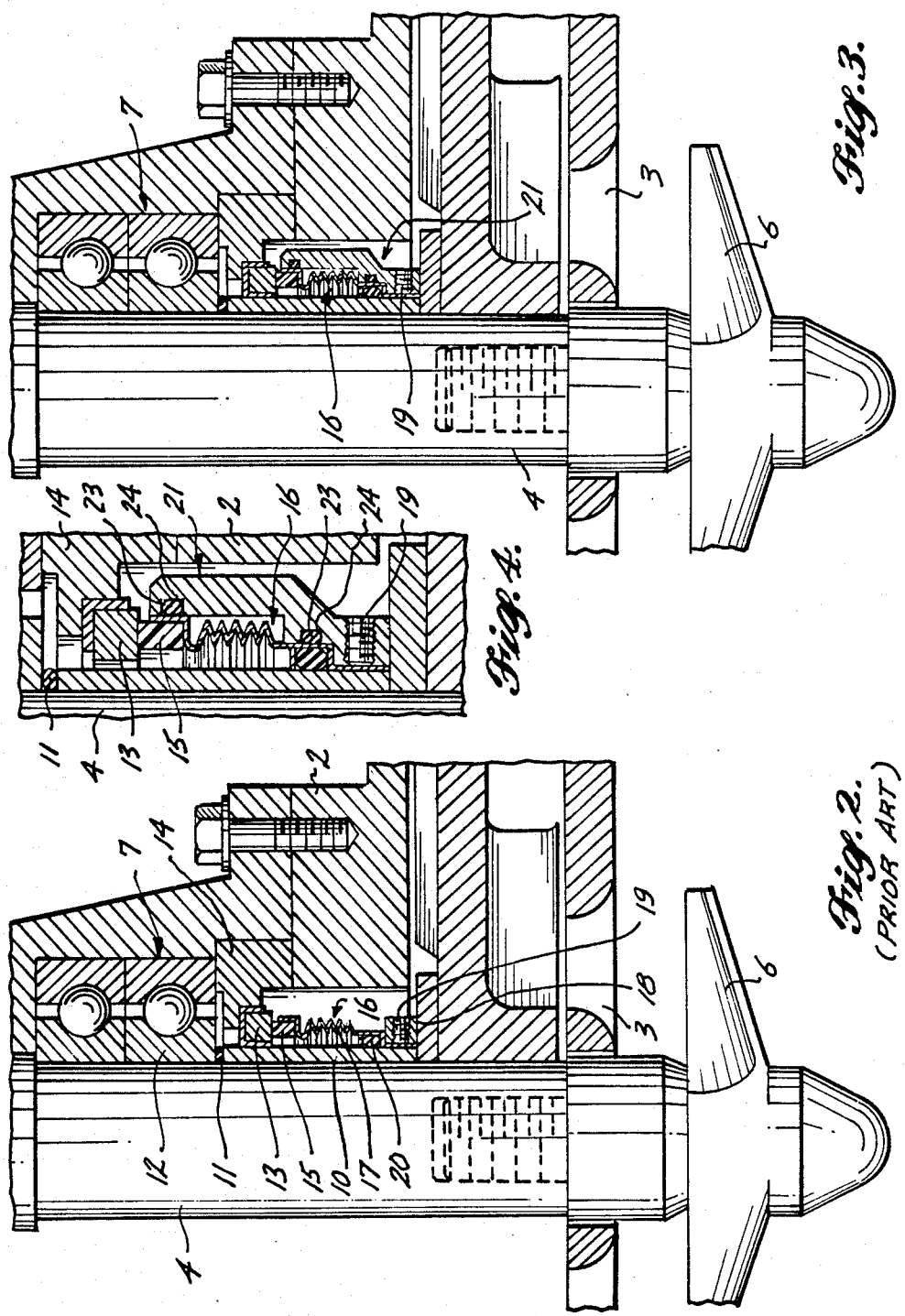

FACE-TYPE SHAFT SEAL WITH SHROUD

BACKGROUND OF THE INVENTION

1. Field of the Invention

The present invention relates to an improved shaft seal. More specifically, the present invention relates to a shroud for a face seal having a resilient bellow or diaphragm urging a rotating seal component axially of a shaft against a stationary seal component, particularly in a centrifugal pump adapted for pumping liquid or slurries containing particulates.

2. Prior Art

A representative shaft seal used in connection with a centrifugal pump is shown in Rockwood et al. U.S. Pat. No. 4,406,465, issued Sept. 27, 1983. In such an application, it has been found to be desirable to use a "face seal" which has a stationary component with a flat, precisely machined, radial surface and a rotating component having an abutting flat radial surface similarly precisely machined. A resilient member biases the rotating component against the stationary component.

To assure a reliable leak-proof seal in a variety of applications, the construction of face seals has become increasingly complex, as illustrated by the seal constructions shown in Van Vleet U.S. Pat. No. 3,188,095, issued June 8, 1965; Van Vleet U.S. Pat. No. 3,184,244, issued May 18, 1965; Azibert U.S. Pat. No. 4,576,384, issued Mar. 18, 1986; and Azibert et al. U.S. Pat. No. 4,625,977, issued Dec. 2, 1986.

An economical alternative is a "welded metal bellows seal" which has a set of stacked rings acting similarly to a Belleville spring but with edges of adjacent rings welded together. The stack of rings form the resilient member for biasing the rotating seal component axially of the shaft against the stationary seal component. The "Type 680" seal available from EG&G SEALOL of Cranston, R.I., is representative of the bellows seal. Such seal works quite well in some centrifugal pump applications. In some applications, however, the liquid or slurry to be pumped contains abrasive particulates. Vaughan U.S. Pat. No. 3,774,323, issued Nov. 27, 1973, for example, shows a centrifugal pump used for dredging. The dredged material may contain grit such as sand. Similarly, Vaughan U.S. Pat. No. 3,973,866, issued Aug. 10, 1976, discloses a pump for slurries containing solids which may include abrasive particulates. For such applications, the gritty or abrasive material can cause premature deterioration of the exposed welds of the resilient bellows, destroying the integrity of the economical welded metal bellows seal.

SUMMARY OF THE INVENTION

The principal object of the present invention is to provide an improvement for a conventional bellows-type face seal allowing such seal to be used reliably over an extended period in a centrifugal pump when liquids or slurries containing abrasive particulates are to be pumped, which improvement is of inexpensive construction and easy to install and will greatly increase the life of the seal assembly.

In the preferred embodiment of the present invention, the foregoing objects are accomplished by providing a shroud having a generally cylindrical cavity with an inner wall portion extending close alongside the bellows assembly of the seal for at least substantially the full axial extent of the resilient bellows of such assembly. Consequently, the bellows is shielded from the liquid being pumped. One end portion of the shroud can be clamped to the bellows assembly and to the pump drive shaft for rotation of the shroud with the bellows assembly. The opposite end portion of the bellows assembly carries the rotary sealing component of the seal which is biased by the resilient bellows against the stationary seal component carried by the pump casing. The shroud is spaced outward from the stationary seal component and another resilient sealing member, such as an O ring, can be loosely engaged between the shroud and the stationary seal component. Preferably, there is no appreciable resistance to relative axial movement of the shroud and the stationary seal component so that the desired force of the resilient bellows urging the rotary seal component against the stationary seal component is maintained.

BRIEF DESCRIPTION OF THE DRAWINGS

FIG. 1 is a somewhat diagrammatic side elevation of a centrifugal pump of the type with which the shaft seal shroud in accordance with the present invention can be used, with parts broken away.

FIG. 2 is an enlarged, fragmentary, longitudinal section through the pump of FIG. 1, but showing a conventional seal construction; FIG. 3 is a corresponding fragmentary longitudinal section through the same pump, but improved by addition of the shaft seal shroud in accordance with the present invention; and FIG. 4 is a further enlarged fragmentary longitudinal section through the shaft seal shroud in accordance with the present invention, with parts broken away.

DETAILED DESCRIPTION

FIG. 1 illustrates the general environment in which the shaft seal shroud in accordance with the present invention is intended to be used. A representative centrifugal pump 1 has a casing 2 with axial inlet apertures 3 at the bottom. The upright drive shaft 4 for the internal impeller 5 and external booster propeller-chopper 6 is journaled in upper bearings 7. Slurry or liquid containing grit or other particulate matter is drawn upward through the inlet apertures 3 and is discharged generally circumferentially through the outlet pipe 8. The shaft seal assembly 9 improved in accordance with the present invention prevents the liquid being pumped from leaking out the top of the casing alongside the drive shaft 4.

The conventional bellows seal construction is illustrated in FIG. 2. A bushing 10 is fixed to the drive shaft 4 for axial positioning of the drive shaft in the pump casing 2. A resilient O-ring 11 is positioned between the top of bushing 10 and the bottom of the rotating inner race 12 of the lower shaft bearing 7.

The stationary seal ring component 13 is held in the stationary seal gland assembly 14 which is clamped to the pump casing 2. Such stationary component 13 has a flat radial bottom surface.

The rotating seal ring component 15 is carried by one end of a resilient, welded metal bellows assembly 16 having inclined rings 17 welded together at their inner and outer peripheral adjacent edges. The other end portion of such bellows assembly is encircled by a mounting ring 18 having setscrews 19 for clamping the bellows assembly to the close-fitting bushing 10 encircling the drive shaft 4. A resilient O-ring 20 is engaged between the inner surface of the bellows and the shaft bushing slightly above the mounting ring 18.

In the improved construction shown in Figures 3 and 4, the seal assembly is identical to that shown in FIG. 2 with the exception that the mounting ring 18 of the FIG. 2 seal is deleted and replaced with a generally cylindrical shroud 21 in accordance with the present invention. The bottom end portion of the shroud forms a collar having an internal cylindrical recess which fits closely over the bottom end portion of the bellows assembly 16 and has threaded bores for the setscrews 19 to clamp the shroud and the bellows assembly to the shaft bushing 10 and shaft 4.

From its clamping bottom end portion, the shroud is stepped outward to extend alongside substantially the full axial length of the rotating bellows assembly. Preferably there are resilient O-rings 23 partially received in grooves 24 at opposite sides of the welded bellows rings 17 to deter intrusion of liquid to the inside of the shroud into engagement with the bellows rings. Nevertheless, such O-rings 23 need not assure a liquid tight seal in order that the bellows rings be protected against the rapid deterioration from abrasion which can occur in the conventional construction shown in FIG. 2. In fact, the fit of the O-rings 23 against the bellows assembly 16 is sufficiently loose so as not to interfere with axial extension and contraction of the bellows as required to maintain the desired pressure of the rotating seal ring component 15 against the stationary seal ring component 13.

The effect of the shroud of the present invention on the life of the seal assembly can be dramatic. In one application where the liquid to be pumped contained sand and possibly other abrasive particulates, failure of the conventional seal construction occurred in a matter of a few weeks as compared to at least several months for the improved construction. With reference to FIG. 1, prior to start up, slurry or liquid containing the gritty material can pass through the inlet apertures 3, between the outer edge of the impeller 5 and the inner upright surface of the casing 2, along the top of the impeller and into the casing recess in which the seal assembly is mounted. In the conventional construction shown in FIG. 2, when the drive shaft 4 is rotated at high speed rotating the bellows assembly 16 with it, the slurry or liquid containing gritty material is caught between the stationary casing 2 and the exposed outer edge welds of the rings 17. Such welds are prematurely worn by abrasive high speed contact with the gritty material.

In the improved construction shown in FIGS. 1, 3 and 4, the bellows assembly is shielded by the shroud 21 which also rotates with the drive shaft 4. Even if liquid containing gritty material works its way into the cavity between the shroud and the bellows assembly, the contact of gritty material with the bellows welds is not nearly so abrasive because such trapped liquid is quickly induced to rotary movement with the bellows and the shroud. At the exterior of such cavity, the thick rigid shroud is not prone to premature failure by abrasion. As shown in FIGS. 3 and 4, the radial thickness of the shroud 21 is several times as great as the radial thickness of the bellows 16.

I claim:

1. In a liquid pump having a casing, a rotary pumping member mounted for rotation in such casing, a rotary drive shaft extending into the casing for rotating the rotary pumping member, bearing means mounting the shaft and sealing means for preventing access to the bearing means of the liquid being pumped from the casing including a first seal component encircling the drive shaft and mounted stationarily relative to the casing, a second seal component encircling and mounted for rotation with the drive shaft and a generally cylindrical liquid tight axially resilient member encircling the drive shaft, extending lengthwise therealong, having one end portion bearing on the second seal component and biasing such second seal component toward the first seal component to an abutting sealing condition, the improvement comprising a shroud attachment including a collar encircling and fitted on the shaft adjacent to the end of the resilient member remote from the sealing means, a shroud portion extending from said collar lengthwise of the drive shaft into overlapping relationship with the second seal component and enclosing the resilient member to shield the exterior of the resilient member, and a third seal component carried by said shroud in slidable relationship axially of the shaft to the second seal component.

2. In a liquid pump having a casing, a rotary pumping member mounted for rotation in such casing, a rotary drive shaft extending into the casing for rotating the rotary pumping member, bearing means mounting the shaft and sealing means for preventing access to the bearing means of the liquid being pumped from the casing including a first seal component encircling the drive shaft and mounted stationarily relative to the casing, a second seal component encircling and mounted for rotation with the drive shaft and a generally cylindrical liquid tight axially resilient metal bellows assembly encircling the drive shaft, extending lengthwise therealong, having one end portion carrying the second seal component, said one end portion having an axial flange encircling the second seal component and said metal bellows biasing such second seal component toward the first component to an abutting sealing condition, the improvement comprising a shroud attachment including a collar encircling and fitted on the shaft adjacent to the end of the resilient member remote from the sealing means, a shroud portion extending from said collar lengthwise of the drive shaft into overlapping relationship with the second seal component, having an inner, generally cylindrical cavity with an inner wall portion extending close alongside the resilient metal bellows for at least substantially the full axial extent of the resilient metal bellows to shield the exterior of the resilient metal bellows and a third seal component carried by said shroud in slidable relationship axially of the shaft to the second seal component.

3. In a liquid pump having a casing, a rotary pumping member mounted for rotation in such casing, a drive shaft extending into the casing for rotating the rotary pumping member, bearing means mounting the shaft and a seal for preventing access of the liquid being pumped from the casing to the bearing means including a first seal component encircling the drive shaft and mounted substantially stationarily relative to the casing, a second seal component encircling and mounted for rotation with the drive shaft and a generally cylindrical liquid tight resilient member carrying the second seal component, encircling the drive shaft, mounted for rotation therewith and biasing the second seal component toward the first seal component generally axially of the drive shaft to an abutting sealing condition, the improvement comprising a shroud elongated axially of the drive shaft and having an inner, generally cylindrical cavity with an inner wall portion extending close alongside the resilient member for at least substantially the full axial extent of the resilient member to limit exposure of the resilient member to the liquid being pumped, one end portion of said shroud encircling the portion of the resilient member axially remote from the first seal component and the other end portion of said shroud encircling the second seal component, means mounting said shroud for rotation with the drive shaft and the resilient member, and third resilient seal means for limiting flow of liquid between said shroud and the second seal component.

4. In the pump defined in claim 3, the third resilient seal means being loosely engaged between the shroud and the second seal component so as not to interfere with relative axial movement of the shroud and the second seal component.

5. In a liquid pump having a casing, a rotary pumping member mounted for rotation in such casing, a drive shaft extending into the casing for rotating the rotary pumping member, bearing means mounting the shaft and a face seal for preventing access to the bearing means of the liquid being pumped including a first seal component encircling the drive shaft and mounted stationarily relative to the casing, a second seal component encircling and mounted for rotation with the drive shaft and a generally cylindrical, liquid tight, axially resilient, metal bellows assembly encircling the drive shaft, carrying the second seal component, having an axial flange at one axial end portion encircling the second seal component and biasing such second seal component toward the first seal component to an abutting sealing condition, the improvement comprising an axially elongated rigid shroud attachment including a collar encircling and clamped to the drive shaft adjacent to the end portion of the bellows assembly remote from the first seal component, an intermediate portion having an inner, generally cylindrical cavity encircling the metal bellows assembly with an inner wall portion extending close alongside the bellows assembly for at least substantially the full axial extent of the bellows assembly to shield the exterior of the bellows assembly from the liquid being pumped, a free end portion encircling the second seal component and the axial flange of the metal bellows assembly and a third seal component carried by said shroud in slidable relationship axially of the shaft to the second seal component.

6. In the pump defined in claim 5, a resilient sealing ring loosely engaged between the second seal component and the shroud for limiting flow of liquid between the second seal component and the shroud and into the shroud cavity.

7. In the pump defined in claim 5, the intermediate portion of the shroud having a radial thickness several times as great as the radial thickness of the metal bellows.

* * * * *